Patented Jan. 16, 1951

2,538,553

UNITED STATES PATENT OFFICE 2,538,553

COMPOSITIONS AND METHOD FOR REMOVING CATIONS FROM LIQUID MEDIA

David G. Braithwaite, Chicago, Ill., assignor to National Aluminate Corporation, Chicago, Ill., a corporation of Delaware No Drawing. Application October 6, 1948, Serial No. 53,143

9 Claims. (Cl. 260—67)

The present invention relates to compositions for and a process of removing cations from liquid media, such as aqueous media.

It has been proposed to remove cations from aqueous solutions by contacting the solutions with a solid, granular mass prepared by merely heating refinery acid-sludge, with or without the use of additional sulfonating agent. With the acid-sludges commonly encountered in this country, however, such a process requires the use of relatively large excesses of sulfuric acid, over and above that present in the sludge, and even then the products are most often deficient in desirable properties, i. e., they are too friable, they do not possess a desired high density, and they are characterized as being quite oily and this oil content cannot be easily and completely removed, so that the products are thereby rendered unfit for most uses.

An object of the invention is to provide new and improved compositions for the replacement of metallic cations.

A further object is to provide a new and improved method of treating and sulfonating petroleum acid sludge in such a way as to form new resinous cation exchange bodies which are less friable, possess a higher density and are substantially free from undesirable oily content as compared with known cation exchange bodies made from petroleum acid sludge.

Another object of this invention is to provide a new and improved cyclic process for the replacement of metallic cations, such as those of the alkali and alkaline-earth metals, by hydrogen.

It is a further object of this invention to provide a cyclic process for the replacement of metallic cations of the alkaline-earth metals by sodium ions by contacting a solution containing said alkaline-earth cations with a mass comprising a substantially insoluble, sulfonated resin derived from oil refinery acid-sludge and furfural, said sulfonated resin being charged with sodium ions.

A further object of this invention is to provide a substantially insoluble, sulfonated resin derived from refinery acid-sludge and furfural, capable of absorbing or exchanging cations in either the hydrogen or sodium cycle, and capable of being repeatedly regenerated for further use. Other objects will be apparent from the following description.

In accordance with this invention, it has now been found that acid-sludge, obtained as a by-product from the sulfuric acid refining of petroleum oils, will react with aqueous furfural to form a hard, tough resin which can be ground to a desirable particle size and treated with sulfonating agents under controlled conditions of time, temperature, and acid strength, to yield a substantially insoluble, granular mass exhibiting pronounced ability to absorb or exchange cations from solution.

The intermediate resin obtained from furfural and the acid-sludge is preferably obtained by mixing one part of the sludge with 0.25 to 0.50 part of furfural and 0.25 to 0.50 part of water (all parts being expressed on a weight basis). After the ingredients are well mixed, the mixture is slowly heated to a temperature in the range of 60° C. to 100° C., which causes gelation in 15 to 30 minutes. The resulting gel is dried for several hours at a temperature of approximately 90° C. to 100° C. and ground to a desirable particle size. After drying, the finished intermediate resin is found to weigh approximately 80% to 85% of the total weight of the starting materials.

This intermediate resin is now treated with sulfonating agents such as chlorosulfonic acid or sulfuric acid of the strength commonly known as 20% to 30% fuming acid. Based on the weight of the acid-sludge used in preparing the intermediate resin, the sulfonating agent is preferably employed in the ratio of one to two parts, by weight, per part of acid-sludge. Sulfonation is carried out at temperatures ranging from 25° C. to 100° C. with the time for addition of the acid governed by the size of the batch and the temperature, and being sufficient to prevent excessive heating and to allow the consumption of the acid so that the reaction mixture does not become extremely "wet" in appearance. After the addition of the acid is complete, it may be desirable to maintain the batch at the same temperature for an additional period of time before dumping it into a large volume of water and washing out the excess acid.

Although the acid-sludges encountered in refinery practice will all be quite similar in general nature and suitable for the practice of this invention, it was found that an acid-sludge formed in the production of white oil from a heavy fraction of Mid-Continent crude was particularly useful. This sludge showed the following analysis, employing the method described by Holzman and Suknarowski in the Analytical edition of "Industrial and Engineering Chemistry," volume 7, page 378 (1935).

| | Percent |
|---|---|
| Mineral oil | 24.6 |
| Sulfonic acids | 40.9 |
| Sulfuric acid | 28.5 |
| Insoluble matter | 2.9 |
| Water | 2.3 |

Another acid-sludge which was found equally suitable was formed in the production of medicinal grade paraffin oil from a naphthenic base stock, and had approximately the same analysis as given above for the white oil acid-sludge.

To further illustrate the features of the invention, the following examples of the preparation of ion exchangers are given, although it is to be understood that the invention is not limited to the procedure contained in these examples:

*Example I*

Four hundred grams of the medicinal oil acid-sludge described hereinabove was mixed with 100 grams of furfural and 160 grams of water at a temperature between about 25° C. and 50° C., until a perfectly homogeneous liquid mixture was obtained. The mixture was then slowly warmed with stirring over a period of 20 minutes to about 60° C., whereby the viscosity of the mixture was greatly increased. The temperature was then slowly increased to 75° C. to 100° C. with further stirring until gelation occurred (about 20 minutes longer). Heating at approximately 100° C. was then continued for two hours, after which 490 grams of intermediate resin was obtained which was ground and the portion of approximately $-12+40$ U. S. screen size retained for the next step.

One hundred twenty-three grams of the intermediate resin was treated with 150 grams of 20% to 30% fuming sulfuric acid by adding the acid slowly with mixing, over a 4-hour period, to the resin at 75° C. to 100° C. After all of the acid had been added, the mixture was mixed for an additional hour at the same temperature. The product was cooled, washed with water, ground and screened ($-12+40$ mesh) and the screened acid resin converted to the sodium form by soaking in excess dilute aqueous sodium carbonate. The resulting resin was hard and black, and showed a capacity of 10,115 grains per cubic foot, in terms of calcium carbonate, as determined by a titration method.

The method used for determining the capacity is as follows: The resin is washed free of excess sodium carbonate until, upon standing for an hour in fresh distilled water, it will not impart alkalinity (to phenolphthalein indicator) to the water. Twenty-five milliliters (ml.) of the resin is then added to 200 ml. of distilled water and 25 ml. of standard 1/N acid added. The resin mixture is stirred for 30 minutes, filtered, and the resin washed with four 25-ml. portions of distilled water, the washings being added to the original filtrate. The combined filtrate is then titrated to the phenolphthalein end-point with standard sodium hydroxide solution. The capacity is then calculated by the relation:

1 ml. of 1/N acid per 25 ml. of resin = 872 grains per cubic ft. (as $CaCO_3$)

*Example II*

Four hundred grams of the medicinal oil acid-sludge of the foregoing example were converted to an intermediate resin by reacting it with 200 grams of furfural and 160 grams of water, as in Example I. The yield of intermediate resin, before grinding and screening, was 656 grams.

One hundred sixty-four grams of the intermediate resin were treated with 150 grams of 20% to 30% fuming sulfuric acid over a two-hour period at 75° C. to 100° C., after which the mixture was mixed and heated for an additional hour, cooled, washed, ground, screened ($-12+40$ mesh), and soaked in excess dilute sodium carbonate solution to convert it to the sodium form. The resulting hard, black resin showed an exchange capacity of 9,915 grains per cubic foot (as $CaCO_3$), determined by titration.

*Example III*

A batch was prepared in a larger quantity than that given in Example I by carrying out the entire operation, to the point of washing, in a laboratory model ribbon mixer equipped with a steam jacket, to which steam was supplied throughout the process at atmospheric pressure. Mixing was accomplished by means of "ribbon" blades mounted on a horizontal, rotating shaft extending the length of the mixer. The product, after the usual washing, grinding, and conversion by alkaline soaking, was evaluated for exchange capacity in the sodium cycle by means of percolation through fixed beds, in the conventional manner. The types of materials employed, the quantities, the conditions of the reaction, and the capacity of the resultant product are tabulated in the following table:

TABLE 1

| | |
|---|---|
| Type of acid-sludge used | White-oil |
| Weight of acid-sludge, grams | 500 |
| Weight of furfural, grams | 125 |
| Weight of water, grams | 200 |
| Time for gelation, minutes | 40 |
| Additional reaction time, minutes | 180 |
| Weight of fuming acid, grams | 750 |
| Time for acid addition, minutes | 120 |
| Additional reaction time, minutes | 60 |
| Capacity, grains/cu. ft. as $CaCO_3$ (average)—regenerated with 2.5 lb. sodium chloride per cubic foot of exchanger | 5,300 |
| Capacity, grains/cu. ft. as $CaCO_3$ (average)—regenerated with 6 lb. sodium chloride per cubic foot of exchanger | 7,600 |

*Example IV*

The same procedure was followed as in Example III except that a different starting material was employed with different proportions of reactants, different conditions of reaction, and with slightly different results, as set forth in the following table:

TABLE 2

| | |
|---|---|
| Type of acid-sludge used | Medicinal oil |
| Weight of acid-sludge, grams | 600 |
| Weight of furfural, grams | 150 |
| Weight of water, grams | 240 |
| Time for gelation, minutes | 30 |
| Additional reaction time, minutes | 180 |
| Weight of fuming acid, grams | 900 |
| Time for acid addition, minutes | 120 |
| Additional reaction time, minutes | 60 |
| Capacity, grains/cu. ft. as $CaCO_3$ (average)—regenerated with 2.5 lb. sodium chloride per cubic foot of exchanger | 5,000 |

Any of the sulfonated resins prepared as indicated, preferably after being comminuted and screened to a uniform granular state, may be used for the exchange of one cation for another. While the exchange may be effected in the conventional manner by passing a fluid containing cations through a bed of the ion-exchanging material in either the hydrogen (acid) form or a salt form, the exchange may also be accomplished by other methods of contact, such as by stirring a portion of the sulfonated resin material in a liquid containing cations to be exchanged.

Revivification, or regeneration, of the exchange material, when it has become exhausted may be accomplished by treatment of the spent material with a liquid containing those cations desired for exchange purposes (e. g., hydrogen ion or sodium ion) as is well understood in the art. For example, aqueous solutions of sodium chloride may be passed through a bed of material which has become exhausted by exchange of sodium ions for calcium and/or magnesium ions, with the result that the calcium and/or magnesium ions in the bed are replaced with sodium. The regenerated resin is then washed free of the spent regenerant solution, whereupon it is ready for reuse. Similarly, dilute solutions of acids may be passed through a bed of material which has become exhausted by exchange of hydrogen ions for other cations, with the result that the other cations in the bed are replaced by hydrogen. After washing the bed free of excess regenerant, it is then ready for reuse in the hydrogen cycle.

The ion exchange products of the invention may be described as sulfonated gelled hydrated reaction products of furfural and oil refinery acid-sludge. These products exist either in the form of the free acids or of salts thereof. For example, where the products have been regenerated with an acid, they exist primarily in the form of the free acid. Where they have been regenerated with an alkali or with an alkali metal salt, the products exist primarily in the form of salts. In this latter case, where the metallic cation is sodium or other alkali metal ion, it is capable of reacting by base exchange with the ions present in hard water, such as calcium or magnesium. The products of the present invention are especially useful in the treatment of water where the hardness is not extremely high, but it is nevertheless desirable to soften the water provided it can be done without too much expense. The intermediate products which are obtained prior to the sulfonation reaction are primarily useful in the preparation of the final products, although it is conceivable that they may have other uses apart from this use.

The invention is hereby claimed as follows:

1. An improved ion exchange body from the group consisting of the sulfonated gelled hydrated product of the reaction of furfural and oil refinery sulfuric acid-sludge and said reaction product which has been regenerated with an alkali.

2. An improved ion exchange body which is the sulfonated gelled hydrated product of the reaction of furfural, water, and oil refinery sulfuric acid-sludge reacted in the proportions of one part of oil refinery sulfuric acid-sludge to 0.25 to 0.50 part of furfural to 0.25 to 0.50 part of water.

3. An acid regenerated sulfonated gelled hydrated product of the reaction of furfural and oil refinery sulfuric acid-sludge.

4. An alkali regenerated sulfonated gelled hydrated product of the reaction of furfural and oil refinery sulfuric acid-sludge.

5. The resin which results from heating at a temperature of 60 degrees C. to 100 degrees C. furfural, water, and oil refinery sulfuric acid-sludge in proportions of one part of oil refinery sulfuric acid-sludge, 0.25 to 0.50 part of furfural and 0.25 to 0.50 part of water until gelation occurs.

6. The method of treating liquid media to remove cations therefrom which comprises contacting such media with a mass comprising a substantially insoluble resinous cation-exchanging body from the group consisting of the reaction products of a sulfonating agent with the product of the reaction of furfural and oil refinery sulfuric acid-sludge and the said reaction products which have been regenerated with an alkali.

7. The method of treating liquid media to replace metallic cations therefrom by hydrogen ions which comprises contacting such media with a mass comprising a substantially insoluble resinous cation-exchanging body which is the reaction product of a sulfonating agent with the product of the reaction of furfural and oil refinery sulfuric acid-sludge.

8. The method of treating liquid media to replace hardness-producing cations therefrom by sodium ions which comprises contacting such media with a mass comprising a substantially insoluble resinous cation-exchanging body which is the reaction product of a sulfonating agent with the product of the reaction of furfural and oil refinery sulfuric acid-sludge, said reaction product, after preparation, having been charged with sodium ions.

9. A resin from the group consisting of the sulfonated and unsulfonated gelled hydrated products of the reaction of furfural, water and oil refinery sulfuric acid-sludge reacted in the proportions of one part of oil refinery sulfuric acid-sludge to 0.25 to 0.50 part of furfural to 0.25 to 0.50 part of water.

DAVID G. BRAITHWAITE.

REFERENCES CITED

The following references are of record in the file of this patent:

UNITED STATES PATENTS

| Number | Name | Date |
|---|---|---|
| 2,035,123 | Fulton | Mar. 24, 1936 |
| 2,198,381 | Ellis | Apr. 23, 1940 |
| 2,291,226 | Higgins | July 28, 1942 |